United States Patent
Streufert

(10) Patent No.: US 9,248,983 B2
(45) Date of Patent: *Feb. 2, 2016

(54) AUTOMATICALLY ADJUSTABLE SLIDE RETRACT FOR CONVEYOR

(71) Applicant: ILLINOIS TOOL WORKS INC., Glenview, IL (US)

(72) Inventor: Brian P. Streufert, Aurora, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/632,307

(22) Filed: Oct. 1, 2012

(65) Prior Publication Data
US 2014/0091013 A1   Apr. 3, 2014

(51) Int. Cl.
*B07C 5/12* (2006.01)
*B65G 47/95* (2006.01)
*B65G 47/46* (2006.01)

(52) U.S. Cl.
CPC ............... *B65G 47/95* (2013.01); *B65G 47/46* (2013.01)

(58) Field of Classification Search
CPC .......... B07C 5/36; B07C 5/361; B07C 5/362; B07B 13/04; B65G 47/50; B65G 47/71
USPC ................. 209/552, 606, 659, 681, 684, 685; 198/349, 358, 369.1, 735.4, 860.4
See application file for complete search history.

(56) References Cited

U.S. PATENT DOCUMENTS

| | | | |
|---|---|---|---|
| 6,000,555 A * | 12/1999 | Anma | 209/534 |
| 8,833,541 B2 * | 9/2014 | Aillon et al. | 198/369.1 |
| 2002/0020604 A1 | 2/2002 | Gaines | |
| 2009/0038453 A1 | 2/2009 | Malenke et al. | |
| 2009/0038913 A1 | 2/2009 | Malenke et al. | |
| 2009/0242356 A1 * | 10/2009 | Layne | 198/348 |
| 2010/0027656 A1 | 2/2010 | Kadono et al. | |
| 2012/0085686 A1 | 4/2012 | Radema et al. | |

* cited by examiner

*Primary Examiner* — Joseph C Rodriguez
*Assistant Examiner* — Kalyanavenkateshware Kumar
(74) *Attorney, Agent, or Firm* — Nelson Mullins Riley & Scarborough LLP

(57) ABSTRACT

A package handling device includes a conveyor, a sensor system and a reject system. The conveyor transports a product along a product handling line. The sensor system is proximate to the conveyor system to determine at least one characteristic of the product for comparison to product acceptance criteria. Failure of the product to meet product acceptance criteria generates a reject signal. The reject system directs the product to a reject bin responsive to the reject signal via a movable assembly that moves a portion of the conveyor to create a gap in the product handling line. The reject system includes an adjustable retraction mechanism coupled to a frame of the conveyor and to the movable assembly. The adjustable refraction mechanism draws the movable assembly inwardly responsive to receipt of the reject signal to define a size of the gap based on information indicative of a size of the product.

13 Claims, 6 Drawing Sheets

AUTOMATICALLY ADJUSTABLE SLIDE RETRACT FOR CONVEYOR

TECHNICAL FIELD

Example embodiments generally relate to conveyor devices and, more particularly, relate to a conveyor device that includes a sensing system and employs a retractable slide for rejecting items when certain criteria are met.

BACKGROUND

In some production based industries, very dynamic product handling environments may be encountered. As an example, in a product packaging environment such as a food packaging environment, products may be moved along a conveyor system after preparation and then packaged and/or inspected. In some embodiments, sensors or various types of examining equipment may be placed at some point along the product handling line (e.g., proximate to products as they pass by on the conveyor system) so that products can be inspected or otherwise examined for compliance with quality control standards, packing standards, or for various other reasons. Products that fail inspection may be removed from the handling line so that they are not shipped to consumers in a deficient condition.

In some systems, responsive to one of the products being identified for rejection (e.g., based on the product failing inspection or failing to meet one or more criteria that are examined by a sensor or other inspection equipment that can inspect products being moved past such equipment on the conveyor belt), a rejection mechanism may operate to remove the identified product from the line. In some cases, the rejection mechanism may have to be carefully designed to accommodate a package or product of a given size. Given the premium on space in many production environments, it may be advantageous to have the rejection mechanism be made of a minimum size necessary to handle the package or product handled on the line. Thus, the equipment is generally engineered to have components sufficient to handle products of the size expected to be encountered in a given environment. However, particularly in cases where different size products are to be handled on the same product handling line, or where a line is to be converted (temporarily or permanently) to handle different products, it may be difficult or very costly to change the rejection mechanism. In some situations, business imperatives may dictate that the difficulty or expense is unavoidable to enable efficient operation of the line.

BRIEF SUMMARY OF SOME EXAMPLES

Some example embodiments may provide an adjustable slide retract mechanism that may be employed for a reject system. The adjustable slide retract mechanism may be utilized to assist in making a transition between package sizes on a product handling line relatively simple so that proper operation of the reject system may be achieved for different sized packages. Moreover, in some embodiments, the adjustments may be made automatically based on user input or based on a sensed package size.

In one example embodiment, a package handling device is provided. The package handling device may include a conveyor, a sensor system and a reject system. The conveyor transports a product along a product handling line. The sensor system is proximate to the conveyor system to determine at least one characteristic of the product for comparison to product acceptance criteria. Failure of the product to meet product acceptance criteria generates a reject signal. The reject system directs the product to a reject bin responsive to the reject signal via a movable assembly that moves a portion of the conveyor to create a gap in the product handling line. The reject system includes an adjustable retraction mechanism coupled to a frame of the conveyor and to the movable assembly. The adjustable retraction mechanism draws the movable assembly inwardly responsive to receipt of the reject signal to define a size of the gap based on information indicative of a size of the product.

In another example embodiment, a reject system for a package handling device that includes a conveyor and a sensor system is provided. The reject system includes a movable assembly and an adjustable retraction mechanism. The movable assembly is disposed at a portion of a product handling line extending from a first end to a second end of the conveyor. The movable assembly moves at least a portion of the conveyor away from the second end to create a gap in the product handling line responsive to receipt of a reject signal from the sensor system. The reject signal is generated responsive to the sensor system determining that at least one characteristic of a product transported by the conveyor does not meet product acceptance criteria. The adjustable retraction mechanism is operably coupled to a portion of a frame of the conveyor and to the movable assembly. The adjustable retraction mechanism draws the movable assembly inwardly responsive to receipt of the reject signal to define a size of the gap based on information indicative of a size of the product.

In another example embodiment, a method of controlling a package handling device is provided. The package handling device may include a conveyor and a sensor system where the conveyor is configured to transport a product from a first end of the conveyor toward a second end of the conveyor along a product handling line. The method includes receiving, from a sensor system disposed proximate to the conveyor, information indicative of at least one characteristic of the product for comparison of the at least one characteristic to product acceptance criteria, determining whether the product meets the product acceptance criteria and generating a reject signal responsive to the product failing to meet the product acceptance criteria. Before, simultaneous with or after the operations above, the method may further include receiving information indicative of a size of the product, determining, based on the information indicative of the product size, a gap size to be provided in the product handling line for rejection of the product responsive to receipt of the reject signal, and directing a reject system to retract a movable assembly to form the determined gap size.

Some example embodiments may improve the performance of product handling equipment and, in particular, the reject system of product handling equipment employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
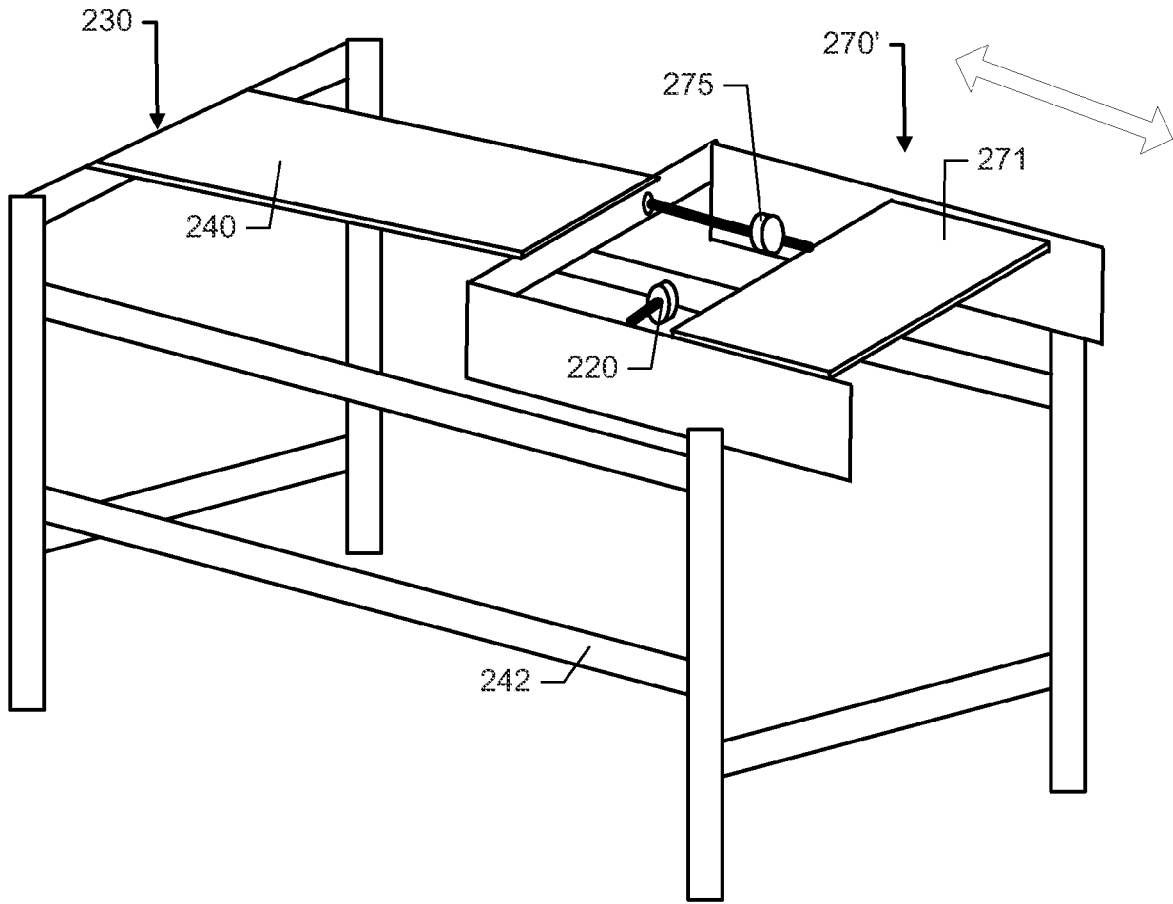
Figure 6:
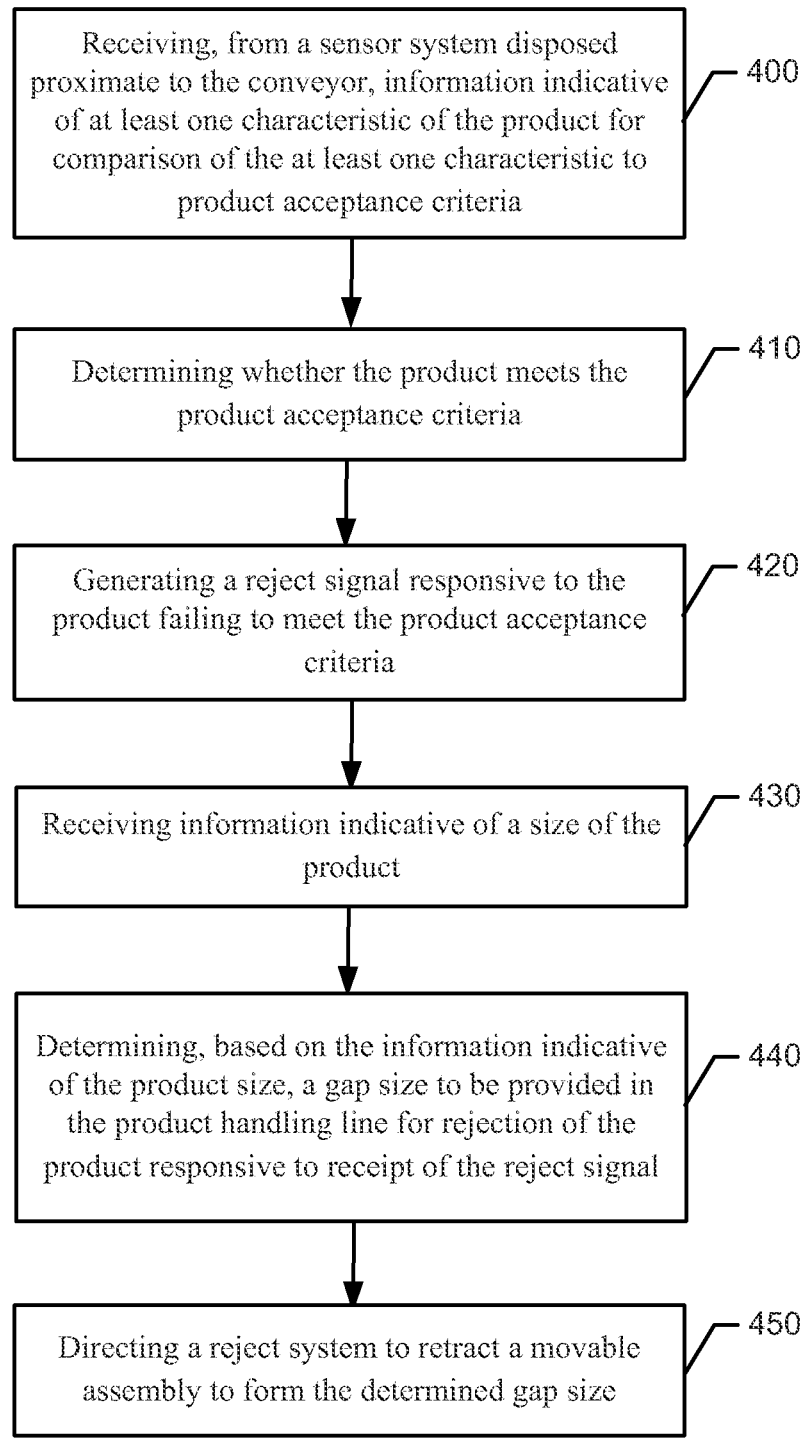

FIG. 5 provides an example structure for a movable assembly including a carriage that does not include any rollers according to an example embodiment; and FIG. 6 illustrates a method according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the ability of operators, or product handling equipment itself, to make adjustments to a reject system used on a product handling line. In this regard, for example, rather than requiring machine re-tooling or major equipment modifications, an operator inserted input or automatically detected input regarding product or package size may be used to determine a size of a gap through which rejected products pass. A selected gap size may then be instituted using a movable assembly that is mounted to an adjustable retraction mechanism that generates the selected gap size based on indications of product or package size. Accordingly, product handling line down time, cost and complexity for conversion from handling one package size to handling another may be reduced.

Figure 1:
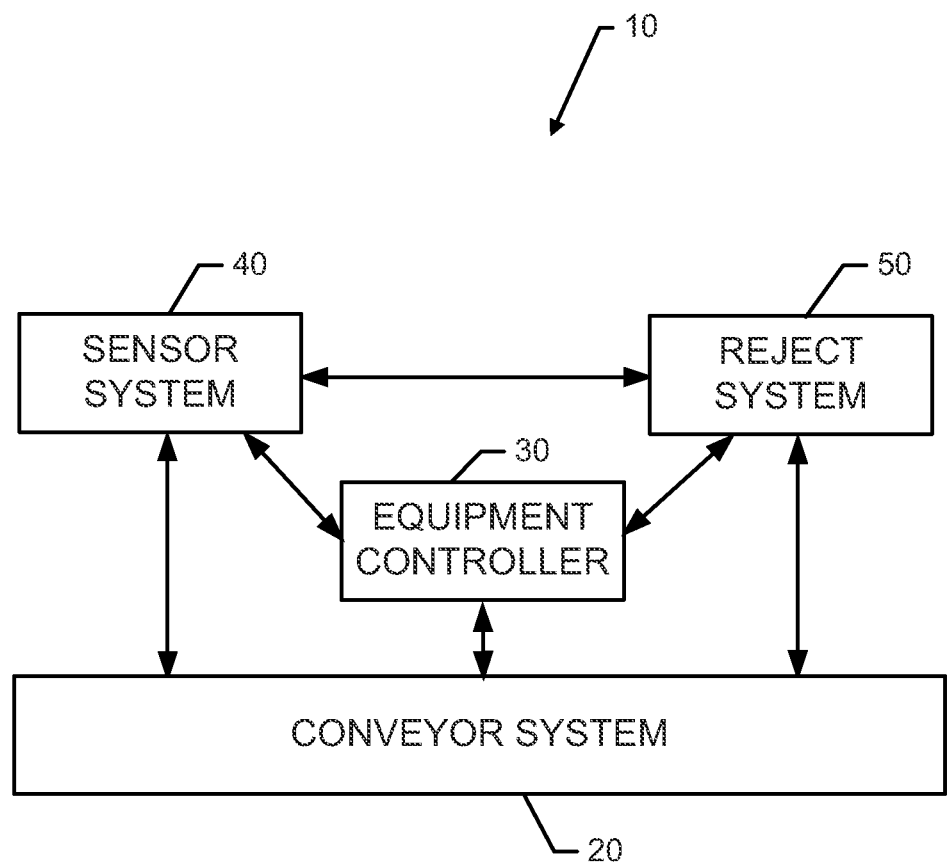
FIG. 1 illustrates a functional block diagram of product handling equipment including a reject system according to an example embodiment.

FIG. 1 illustrates a functional block diagram of product handling equipment including a reject system according to an example embodiment. As shown in FIG. 1, the product handling equipment 10 may include a conveyor system 20. They conveyor system 20 may include a structure for supporting a conveyor belt, or a series of rollers (some or all of which may be powered rollers) to support a product and enable movement of the product from one end of the product handling equipment 10 to the other end thereof responsive to powered operation of the conveyor system 20. In some cases, the conveyor system 20 of the product handling equipment 10 may be in operable communication with conveyor systems of other equipment to define a product handling line over which one or more packing and/or processing tasks may be conducted relative to the product being transported by the conveyor system 20. However, in some embodiments, the product handling equipment 10 may form a beginning, end or the entirety of the product handling line.

The belt and/or rollers of the conveyor system 20 may be powered responsive to control by one or more motors (e.g., electric motors) that may be controlled by equipment controller 30. The equipment controller 30 may include basic power control for the motors including on/off controls and, in some cases, speed control or other more sophisticated operational control features. One or more products may sit on the belt or rollers and, responsive to operation of the one or more motors, the products may be moved along the product handling line so that any number of operations may be performed on the products (e.g., preparation, handling, packaging, inspection, and/or the like).

In an example embodiment, the product handling equipment 10 may further include a sensor system 40 that is configured to perform a sensing operation with respect to a product being transported by the conveyor system 20. In some embodiments, the sensor system 40 may operate to detect one or more characteristics of the product while the product is moving on the conveyor system 20. However, in other embodiments, the sensor system 40 may operate when the product is stopped proximate to the sensor system 40. Thus, for example, the sensor system 40 may operate under the control of the equipment controller 30 or receive operational signaling from the equipment controller 30 to enable the sensor system 40 to perform its sensing operation when the product is appropriately located to enable the operation to be completed.

In some embodiments, the sensor system 40 may include multiple sensors for detection of respective different characteristics of the product. However, inclusion of multiple sensors is not required. In embodiments where multiple sensors are employed, one sensor may be used to detect product presence, location and/or size (e.g., using a camera, one or more light sensors and/or the like). As an example, a camera may capture an image of the product and determine size dimensions (e.g., length, width and/or height) of the product. Alternatively, light sensors may be positioned at various locations that are known distances from each other. Based on an ability to sense light blocked at some of the sensors due to the size of the product, product size may be determined. In either case, or when other mechanisms for determining product size are employed, a product size indication may be generated.

When the product is detected at a particular location, the sensor system 40 may, in some cases, employ another sensor to detect some other characteristic of the product (e.g., weight, temperature, metal content, visual characteristics, internal product defects, and/or the like). As such, for example, the sensor system 40 may include one or more of a scale, a temperature sensor, an x-ray machine, a metal detector, a camera, and/or the like.

In an example embodiment, when a product is inspected by the sensor system 40, the sensor system 40 will operate to detect one or more characteristics of the product and compare the one or more characteristics detected to acceptance criteria. The acceptance criteria may define criteria for accepting and/or rejecting the product. Thus, for example, the acceptance criteria may define specific characteristics that should be detected, or that should not be detected. In some cases, the acceptance criteria may define ranges of acceptable characteristics (e.g., weight ranges, metal content, and/or the like). If the acceptance criteria are not met, the sensor system 40 may generate a reject signal to indicate that a corresponding product is to be rejected or removed from the conveyor system 20. For example, if the product is overweight, or has metal therein, the reject signal may be generated.

In some embodiments, the product handling equipment 10 may further include a reject system 50 that is configured to eject or otherwise remove selected products (i.e., products that do not meet acceptance criteria and therefore which have a reject signal associated therewith) from the conveyor system 20. The reject system 50 may be in communication with the sensor system 40 and/or the equipment controller 30 to receive the reject signal and may operate to remove or eject the product from the conveyor system 20.

In some embodiments, the reject system 50 may include structural components that push, pluck, tip or otherwise force the selected product off of the conveyor system 20 and into a reject bin forming a portion of the reject system 50. However, in an example embodiment, the reject system 50 may interact with the conveyor system 20 to move a portion of the conveyor system 50 in order to create a gap in the path that the product would otherwise travel on the conveyor system 20 (i.e., a gap in the product handling line). The product may continue to be moved along the conveyor system 20 (e.g., by the rollers and/or conveyor belt) and may therefore fall into the reject bin when the gap is encountered. In some embodiments, the reject bin may be positioned under a portion of the conveyor belt or rollers of the conveyor system 20 so that when the conveyor system 20 moves to create the gap, the product can simply fall down into the reject bin. Products in the reject bin may be destroyed, recycled, refurbished, repackaged, or otherwise treated so that they will potentially pass inspection by the sensor system 30 when passed through the product handling equipment 10 in the future.

In some embodiments, the reject system 50 may operate to reject a product by moving a portion of the conveyor system 20 as mentioned above. In this regard, for example, one or more rollers of the conveyor system 20 may be mounted to a movable assembly. The movable assembly may then operated responsive to receipt of the reject signal to move the one or more rollers and create the gap in the product handling line. The movable assembly may move responsive to operation of a pneumatic or electromechanical driver to create the gap. In some embodiments, the electromechanical driver may be embodied as an adjustable retraction mechanism. The adjustable retraction mechanism may be configured to move the movable assembly a distance that is determined based on an indication of product size. The indication may be automatically determined (e.g., using the sensor system 40 as described above), or may be determined by operator input (e.g., by selecting package size for a series of packages to be processed, or by an input provided with respect to each individual package or each package that differs from a default or current size setting. Accordingly, the adjustable retraction mechanism may be configured to automatically adjust the amount of movement of the movable assembly to account for product or package size in order to achieve a desired distance for the gap size.

Figure 2:
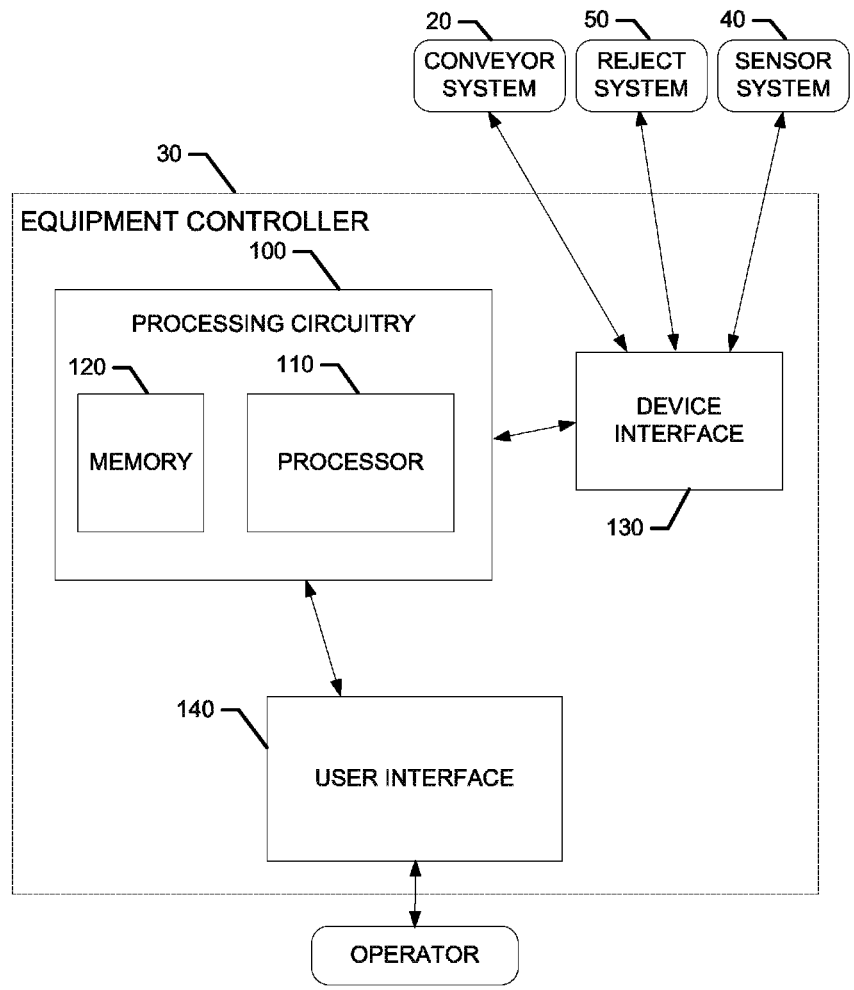
FIG. 2 illustrates a block diagram of control circuitry of the product handling equipment of FIG. 1 according to an example embodiment.

FIG. 2 illustrates a block diagram of the equipment controller 30 of the product handling equipment of FIG. 1 according to an example embodiment. In some embodiments, the equipment controller 30 may include or otherwise be in communication with processing circuitry 100 that is configurable to perform actions in accordance with example embodiments described herein. As such, for example, the functions attributable to the equipment controller 30 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include a processor 110 and memory 120 that may be in communication with or otherwise control a device interface 130 and, a user interface 140. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer.

The user interface 140 may be in communication with the processing circuitry 100 to receive an indication of a user input at the user interface 140 and/or to provide an audible, visual, mechanical or other output to the user (or operator). As such, the user interface 140 may include, for example, a display (e.g., a touch screen), one or more hard or soft buttons or keys, and/or other input/output mechanisms. In some embodiments, the user interface 140 may be provided on a front panel (e.g., positioned on or proximate to a portion of the sensor system 40) of the product handling equipment 10.

The device interface 130 may include one or more interface mechanisms for enabling communication with other devices such as, for example, one or more sensors of a sensor network (e.g., sensor system 40), components of the reject system 50, components of the conveyor system 20, and/or external devices. In some cases, the device interface 130 may be any means such as a device or circuitry embodied in either hardware, or a combination of hardware and software that is configured to receive and/or transmit data from/to sensors that measure any of a plurality of product parameters/characteristics such as weight, temperature, metal content, visual characteristics, internal product defects, and/or the like. In some cases, the device interface 130 may enable the processing circuitry 100 to communicate with motor controllers, power distribution circuits and/or the like to facilitate operation of the product handling equipment 10. Alternatively or additionally, the device interface 130 may provide interface mechanisms for any devices capable of wired or wireless communication with the processing circuitry 100 (e.g., an external machine controller, monitoring equipment, and/or the like).

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the equipment controller 30 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets (e.g., for acceptance criteria and/or for relating a given package size to a corresponding gap size), applications, and/or the like to facilitate operation of the equipment controller 30. Among the contents of the memory 120, applications may be stored for execution by the processor 110 in order to carry out the functionality associated with each respective application. In some cases, the applications may include control applications that utilize parametric data to control the operation of the sensor system 40, the conveyor system 20 and/or the reject system 50 as described herein. In this regard, for example, the applications may include operational guidelines defining a plurality of sets of instructions for operation of the product handling equipment 10.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the equipment controller 30. As such, in some embodiments, the processor 110 (or the processing circuitry 100) may be said to cause each of the operations described in connection with the equipment controller 30 by directing the equipment controller 30 to undertake the corresponding functionalities responsive to execution of instructions or algorithms configuring the processor 110 (or processing circuitry 100) accordingly. As an example, the equipment controller 30 may be configured to control operation of the product handling equipment 10 based on sensed data and/or user input at the user interface 140.

In an example embodiment, the processor 110 may receive an indication of product or package size (e.g., based on operator input or sensor system 20 input) and determine a corresponding gap size to be provided for the product. Responsive to receipt of a reject signal, the processor 110 may provide control signals to the reject system 50 to initiate movement of the movable assembly in an amount sufficient to create the determined gap size. Although some embodiments may provide for a determination of gap size for every product, other embodiments may only engage in gap size determination in response to receipt of the reject signal. Some embodiments may employ dynamic calculation of gap size based on relationships defined for calculation of gap size. However, other embodiments may employ a lookup table that is referenced to determine a gap size for a particular detected product based on its relationship to values or ranges of values in the table.

Figure 3:
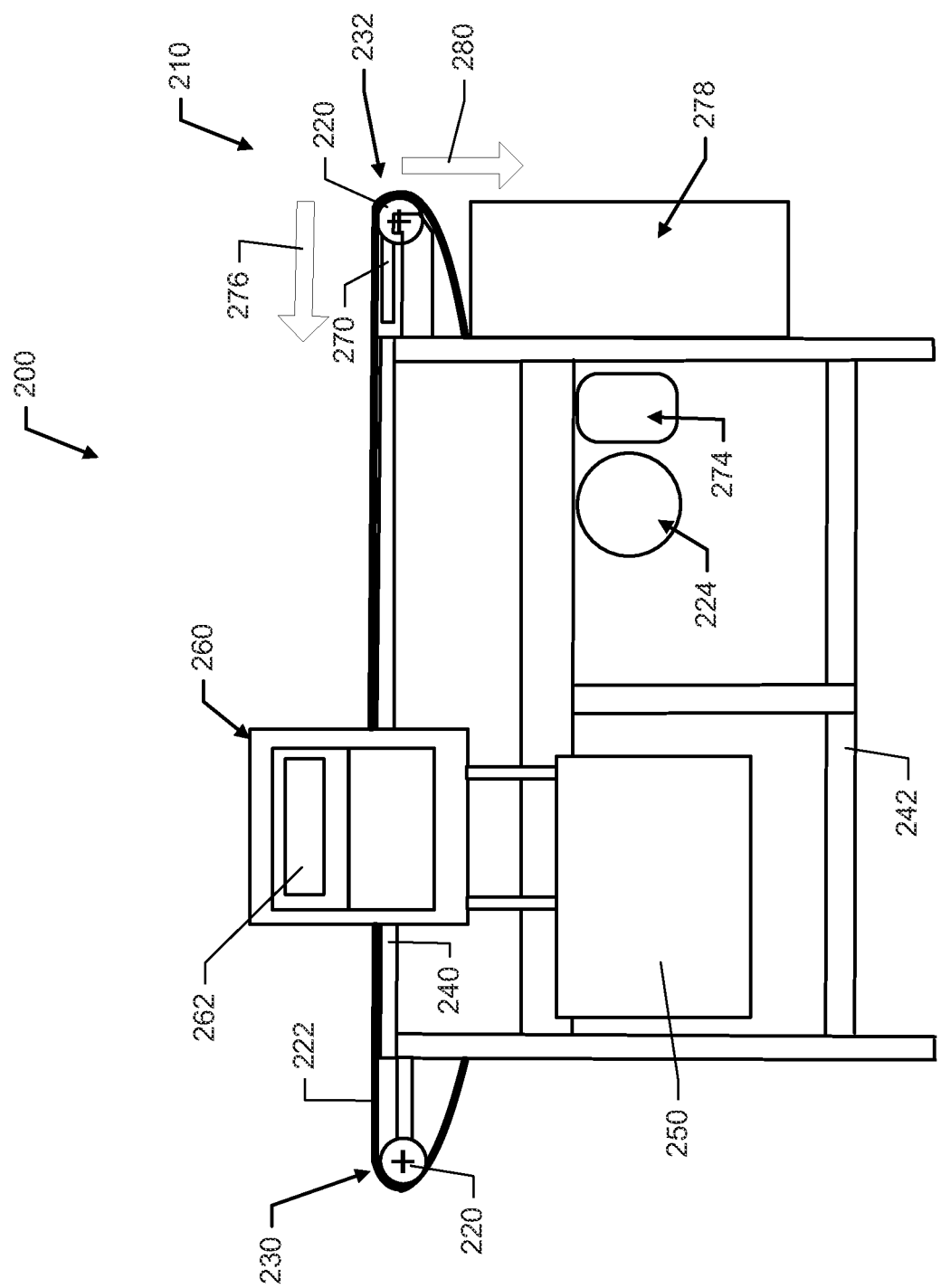
FIG. 3 illustrates a front view of a product handling conveyor system employing a reject system according to an example embodiment.
Figure 4:
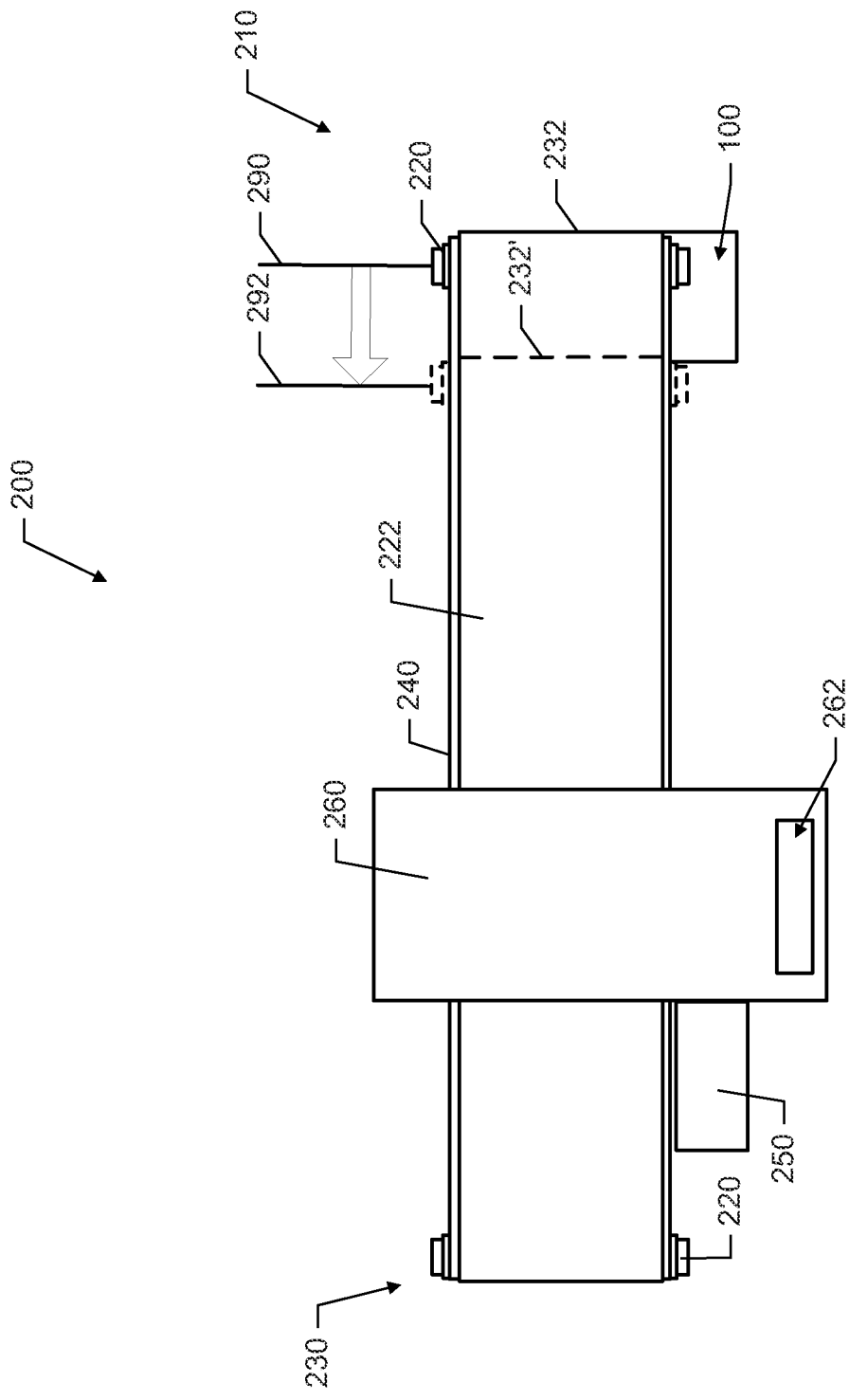
FIG. 4 illustrates a top view of the conveyor system of FIG. 1 according to an example embodiment.

FIG. 3 illustrates a front view of a product handling conveyor system 200 employing a reject system 210 according to an example embodiment. FIG. 4 illustrates a top view of the product handling conveyor system 200. The product handling conveyor system 200 may be an example of the product handling equipment 10 of FIG. 1, and the reject system 210 may be an example of the reject system 50 of FIG. 1. As shown in FIGS. 3 and 4, the product handling conveyor system 200 may include rollers 220 that may engage a conveyor belt 222, which may together form portions of the conveyor system 20 of FIG. 1.

In an example embodiment, a motor 224 may be provided to be operably coupled to one or more of the rollers 220 (or other powered rollers that are not shown) to move the conveyor belt 222. The movement of the rollers 220 may be translated to the conveyor belt 222 to cause corresponding movement of the conveyor belt 222. Thus, it should be appreciated that the rollers 220 need not necessarily be provided at the ends of the product handling line. Instead, the rollers 220 may be disposed at interior portions of the conveyor system 20. In an example embodiment, the conveyor belt 222 may generally operate so that a product that is placed (by whatever means) on the conveyor belt at a first end 230 of the product handling conveyor system 200 is transported toward a second end 232 of the product handling conveyor system 200.

The conveyor belt 222 may ride over a support table 240 that may be affixed to a frame 242. A power panel 250 may be affixed to a portion of the frame 242 to house one or more components of for controlling operation of the product handling conveyor system 200 (e.g., equipment controller 30, sensor system 40, conveyor system 20 or eject system 50 components). In this regard, for example, some of the processing circuitry 100, power distribution circuitry, motor control circuitry and/or other electrical components for controlling the product handling conveyor system 200 may be housed in the power panel 250. In an example embodiment, the power panel 250 may be operably coupled to a sensor housing 260, which may house an embodiment of the sensor system 40 of FIG. 1.

The sensor housing 260 may extend over (e.g., in a transverse direction) all or a portion of the conveyor belt 222 so that a product being transported on the conveyor belt 222 may be inspected or otherwise examined using equipment of the sensor system 40 housed in the sensor housing 260. In some embodiments, the sensor housing 260 may also house control circuitry for the sensor system 40, which may be embodied as the processing circuitry 100 of FIG. 2, or other circuitry capable of communication with the processing circuitry 100. Accordingly, for example, the sensor housing 260 may include a display 262, which may form a portion of the user interface 140. The display 262 may be a touch screen display so that instructions, settings and/or other use inputs may be provided thereat.

In an example embodiment, the end of the support table 240 that is proximate to the second end 232 may include a void space into which the reject system 210 may be at least partially provided (e.g., see FIG. 5). The reject system 210, or at least some components thereof, may be mounted within the void space and may include at least one part that is retractable in order to create the gap. In one example, the reject system 210 may be retractable at one of a plurality of selectable distances based on the operation of a movable assembly 270. The movable assembly 270 may be a carriage that is mounted to ride within a portion of the frame 242 in order to be retractable responsive to operation of and adjustable retraction mechanism 280.

The adjustable retraction mechanism 275 may be embodied as a synchro/server combination, a motor operated lead screw (power screw), worm drive, and/or the like. The adjustable retraction mechanism 275 may be configured to receive signaling (e.g., from the control circuitry 30 or more specifically from the processing circuitry 100) to indicate an amount of movement for the adjustable retraction mechanism 275 to initiate based on the size of the product to be rejected when a reject signal is generated. However, in some embodiments, the adjustable retraction mechanism 275 may simply receive an "ON" or other movement initiating signal for a period of time determined by the processing circuitry 100 to cause a corresponding desired amount of movement needed to create a desired gap size based on the size of the product. In this regard, for example, when the sensor system 40 detects a defective product, the reject signal may be generated by the processing circuitry 100. The sensor system 40 may also detect product size and communicate information indicative of product size to the processing circuitry 100 or the operator may provide (or have provided already) information indicative of product size to the processing circuitry 100. The processing circuitry 100 may then instruct the adjustable retraction mechanism to move the movable assembly 270 by an amount needed to generate the desired gap size. The movable assembly 270 may then retract in the direction shown by arrow 276 to create the desired gap size. The product, which may be conveying toward the second end 232, may then drop into a reject bin 278 as shown by arrow 280.

The movable assembly 270 may ride in or on a track or may otherwise be movably supported by the frame 242. In some cases, the movable assembly 270 may be operably connected to at least one of the rollers 220 to move the roller and the carriage (supporting a portion of the conveyor belt 222) at least partially in the direction shown by arrow 276 to create the gap in the product handling line as described above. However, in other embodiments, the movable assembly 270 may not include any rollers 220, but may simply provide a surface (i.e., the carriage) over which the conveyor belt 222 may ride. FIG. 5 provides an example structure for a movable assembly 270' that may include a carriage 271 that does not have any rollers.

In an example embodiment, the movable assembly 270 may be coupled to a portion of the frame 242 via the adjustable retraction mechanism 275. In some cases, as shown in FIG. 5, the adjustable retraction mechanism 275 may extend longitudinally along a line that is parallel to the longitudinal length of the product handling conveyor system 200. For example, the adjustable retraction mechanism 275 may extend to push the carriage 271 away from the first end 230 and contract or retract to pull the carriage 271 toward the first end 230 by virtue of the coupling of the adjustable retraction mechanism 275 to the carriage 271 on one of the distal ends of the adjustable retraction mechanism 275 and coupling to the frame 242 at the other distal end of the adjustable retraction mechanism 275. Thus, for example, the adjustable retraction mechanism 275 may be embodied as a continuously variable linear actuator or adjusting assembly that operates with or without position feedback. In some examples, a lead screw, worm drive, synchro, servo and/or the like forming the adjustable retraction mechanism 275 may move in a direction that draws the carriage 271 inwardly when retracting to form a gap of a desired size, or pushes the carriage 271 outwardly to return to normal operation after a rejection of a product is executed. Moreover, the amount of movement of the adjustable retraction mechanism 275 and/or the speed of such movement may be determined based on the information indicative of characteristics of the product such as, for example, product size, speed of motion of products on the line, and/or proximity of a product to be rejected to an adjacent product (e.g., product spacing).

Some embodiments may therefore enable a size of a gap in a product handling line to be generated based on the size of the product being handled on the line. In some cases, the gap may be generated by moving a carriage supporting a portion of the line in a first direction, while the product is moved simultaneously in a second direction that is opposite to the first direction. The size of the product being handled may be determined dynamically or may be known via operator input either for an individual product or for a series of products. In some cases, product characteristics may be programmed or stored in association with various different products that a product handling line may be capable of handling. Thus, for example, a particular product for which the line is configured to handle could be selected from memory and system operation may be adjusted accordingly.

FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., product handling equipment 10) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may be practiced relative to controlling a package handling device. The package handling device may include a conveyor and a sensor system where the conveyor is configured to transport a product from a first end of the conveyor toward a second end of the conveyor along a product handling line. The method may include receiving, from a sensor system disposed proximate to the conveyor, information indicative of at least one characteristic of the product for comparison of the at least one characteristic to product acceptance criteria at operation 400, determining whether the product meets the product acceptance criteria at operation 410 and generating a reject signal responsive to the product failing to meet the product acceptance criteria at operation 420. Before, simultaneous with or after operations 400 to 420, the method may further include receiving information indicative of a size of the product at operation 430, determining, based on the information indicative of the product size, a gap size to be provided in the product handling line for rejection of the product responsive to receipt of the reject signal at operation 440, and directing a reject system to retract a movable assembly to form the determined gap size at operation 450. Thus, for example, the gap size may be determined in order to reject a discrete product or row of products spanning the conveyor belt.

In an example embodiment, an apparatus for performing the method of FIG. 6 above may comprise a processor (e.g., the processor 110) configured to perform some or each of the operations (400-450) described above. The processor may, for example, be configured to perform the operations (400-450) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A package handling device comprising:
   a conveyor configured to transport a product from a first end of the conveyor toward a second end of the conveyor along a product handling line;
   a sensor system disposed proximate to the conveyor to determine at least one characteristic of the product for comparison of the at least one characteristic to product acceptance criteria, wherein failure of the product to meet the product acceptance criteria results in generation of a reject signal;
   a reject system configured to direct the product to a reject bin responsive to the reject signal and information indicative of a size of the product via operation of a movable assembly that moves at least a portion of the conveyor away from the second end to create a gap in the product handling line, the gap having a size that is variable,
   wherein the reject system comprises an adjustable retraction mechanism operably coupled to a portion of a frame of the conveyor and to the movable assembly, the adjustable retraction mechanism drawing the movable assembly inwardly responsive to receipt of the reject signal to define a selected size of the gap based on the information indicative of a size of the product.

2. The device of claim 1, wherein the information indicative of the size of the product is determined automatically by the sensor system.

3. The device of claim 1, wherein the information indicative of the size of the product is determined based on operator input.

4. The device of claim 3, wherein the operator input is received to define a package size of a series of products, the product being one package within the series.

5. The device of claim 3, wherein the operator input is specifically received for the product to define a package size of the product.

6. The device of claim 1, wherein the adjustable retraction mechanism is configured to enable movement of the movable assembly over a range of distances, and wherein the adjustable retraction mechanism moves the movable assembly a selected distance that is determined based on the information indicative of the size of the product.

7. The device of claim 1, wherein the adjustable retraction mechanism comprises a continuously variable linear actuator including a worm drive, a synchro, a servo, or a lead screw.

8. A method of controlling a package handling device that includes a conveyor and a sensor system, the conveyor configured to transport a product from a first end of the conveyor toward a second end of the conveyor along a product handling line, the method comprising:
   receiving, from a sensor system disposed proximate to the conveyor, information indicative of at least one characteristic of the product for comparison of the at least one characteristic to product acceptance criteria;
   determining whether the product meets the product acceptance criteria;
   generating a reject signal responsive to the product failing to meet the product acceptance criteria;
   receiving information indicative of a size of the product;
   determining, based on the information indicative of the product size, a selected gap size to be provided in the product handling line for rejection of the product responsive to receipt of the reject signal; and
   directing a reject system to retract a movable assembly to a variable gap size of the movable assembly to the selected gap size based on the information indicative of the product size.

9. The method of claim 8, wherein the information indicative of the size of the product is determined automatically by the sensor system.

10. The method of claim 8, wherein the information indicative of the size of the product is determined based on operator input.

11. The method of claim 8, wherein the reject system comprises an adjustable retraction mechanism operably coupled to a portion of a frame of the conveyor and to the movable assembly, the adjustable retraction mechanism drawing the movable assembly inwardly responsive to receipt of the reject signal to define the determined gap size.

12. The method of claim 11, wherein directing the reject system to retract the movable assembly to form the determined gap size comprises directing the adjustable retraction mechanism to move the movable assembly a selected distance that is determined based on the information indicative of the size of the product.

13. The method of claim 8, wherein directing the reject system to retract the movable assembly to form the determined gap size comprises directing a continuously variable linear actuator including a worm drive, a synchro, a servo, or a lead screw to move to form the determined gap size.

* * * * *